US008812667B1

United States Patent
Chung et al.

(10) Patent No.: US 8,812,667 B1
(45) Date of Patent: Aug. 19, 2014

(54) CIFS PROXIES FOR SCANNING PROTECTION

(75) Inventors: Chang-Wei Chung, Taipei (TW); Ming-Fang Tsai, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 2017 days.

(21) Appl. No.: 11/315,727

(22) Filed: Dec. 21, 2005

(51) Int. Cl.
*G06F 15/173* (2006.01)
*G06F 15/16* (2006.01)
*H04L 29/06* (2006.01)

(52) U.S. Cl.
CPC ............... *H04L 63/145* (2013.01); *H04L 63/10* (2013.01); *H04L 63/12* (2013.01); *H04L 63/0281* (2013.01)
USPC .......................................... 709/225; 709/202

(58) Field of Classification Search
USPC .................................................. 709/202, 224
See application file for complete search history.

(56) References Cited

U.S. PATENT DOCUMENTS

| 5,623,600 | A | * | 4/1997 | Ji et al. ............................. 726/24 |
| 6,088,803 | A | * | 7/2000 | Tso et al. ......................... 726/22 |
| 6,298,380 | B1 | * | 10/2001 | Coile et al. ..................... 709/227 |
| 6,928,555 | B1 | * | 8/2005 | Drew .............................. 726/24 |
| 2002/0129277 | A1 | * | 9/2002 | Caccavale ...................... 713/201 |
| 2004/0158730 | A1 | * | 8/2004 | Sarkar ............................ 713/200 |
| 2005/0038898 | A1 | * | 2/2005 | Mittig et al. .................. 709/230 |
| 2007/0129012 | A1 | * | 6/2007 | Snow ............................ 455/26.1 |

* cited by examiner

*Primary Examiner* — Bunjob Jaroenchonwanit
*Assistant Examiner* — Tom Y Chang
(74) *Attorney, Agent, or Firm* — IPSG, P.C. Intellectual Property Law

(57) ABSTRACT

Methods and apparatus for transparently processing files that are manipulated between a server computer and a client computer using the CIFS protocol. The transparent processing employs an in-line CIFS proxy and may include virus scanning, content scanning, and/or security policy implementation.

24 Claims, 4 Drawing Sheets

CIFS PROXIES FOR SCANNING PROTECTION

BACKGROUND OF THE INVENTION

The CIFS (Common Internet File System) protocol, which was originally proposed by Microsoft Corporation of Redmond, Wash., has made significant gains in the file sharing tool market. Many entities, both public and private, nowadays employ a CIFS-enabled server to manage file access within their networks. Along with the rising popularity of CIFS, many malware programs (such as viruses or adware or the like) have begun to exploit CIFS to spread their destruction. Solutions are required to combat malware and the potential damage that malware can wreak in either the client computer or the server.

When a client computer issues an open, read or write request for a given file, the CIFS instruction is relayed to the file server, which services the request. The inventors herein are aware of anti-virus arrangements in which the file server relays the CIFS instructions to an anti-virus server prior to servicing the request. The anti-virus server then ascertains whether the file at issue should be scanned.

If the file needs to be scanned, the anti-virus server then scans the file and relays the scanning result back to the file server. Depending on the result of the scan, the file-related request by the client computer may be granted or denied. On the other hand, if the file is determined as one that does not need scanning, the anti-virus server informs the file server accordingly, and the file server may then respond to the outstanding request.

The integration of an anti-virus server with a given file server necessary to implement the solution discussed above typically requires a significant amount of effort and expertise on the part of the integrator, as well as specific knowledge regarding the commands and architecture of the file server involved. As such, these custom-crafted solutions tend to be more expensive and time-consuming to implement.

What is desired, therefore, are arrangements and methods for efficiently providing scanning capabilities and/or scanning protection for CIFS-enabled networks.

SUMMARY OF INVENTION

The invention relates, in an embodiment, to a computer-implemented method for implementing monitoring of CIFS (Common Internet File System) communication between a client computer and a server computer. The method includes providing a CIFS proxy between the client computer and the server computer, the CIFS proxy being configured to provide a client IP address that is associated with the client computer as a proxy-to-server source IP address when communicating from the proxy to the server compute. The CIFS proxy is also configured to provide a server IP address that is associated with the server computer as a proxy-to-client source IP address when communicating from the proxy to the client computer. The method also includes monitoring, using the CIFS proxy, client requests and server responses, the client requests pertaining to CIFS communication from the client computer destined for the server computer, the server responses pertaining to CIFS communication from the server computer destined for the client computer. If a client request of the client requests pertains to an open file request to open a file, the method includes performing steps a) through f) as follows. In a step a), the method relays the open file request from the CIFS proxy to the server computer. In a step b), the method intercepts a server response to the open file request. In a step c), the method ascertains whether a file associated with the server response requires processing by the CIFS proxy, the processing is configured to ascertain whether the client computer receives the file associated with the server response. In a step d), the method performs, if the file associated with the server response requires processing by the CIFS proxy, open-file processing on the file associated with the server response. In a step f), the method sends, if the open-file processing determines that the client computer does not receive the file associated with the server response, an error indication from the CIFS proxy to the client computer instead of sending the file associated with the server response. If the open-file processing determines that the client computer receives the file associated with the server response, the method includes relaying the file associated with the server response from the CIFS proxy to the client computer.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
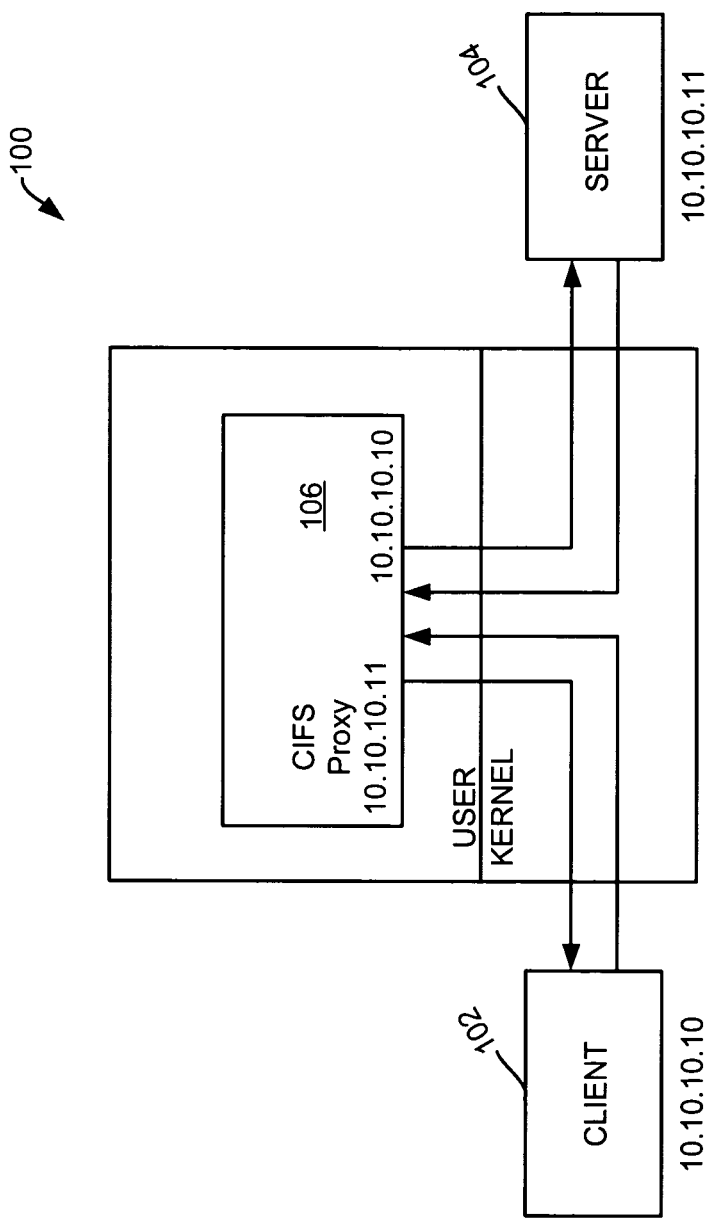
FIG. 1 show, in accordance with an embodiment of the invention, a scanning arrangement that includes a client computer and a file server.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In accordance with embodiments of the present invention, there are provided methods and systems for providing scanning capabilities and/or scanning protection for CIFS-enabled networks without requiring the tedious and time-consuming integration effort on the part of the system integrator. In an embodiment, a transparent CIFS proxy is interposed between the client computer and the file server (i.e., as an in-line solution). The transparent CIFS proxy transparently snoops or eavesdrops on client-server communication that conforms to the CIFS protocol, such as file requests by the client computer as well as on file responses by the file server. That is, the file requests by the client computer and the file responses by the file server are snooped and parsed to ascertain the course of action.

For a read request from the client computer, for example, the transparent CIFS proxy intercepts the request, obtains the file from the file server on behalf of the client computer and scans the file before furnishing the file to the client computer if the scanning result does not prohibit such furnishing. If the scanning result does not permit such furnishing, the transparent CIFS proxy provides, for example, an error indication to the client computer instead.

After the file is open, the transparent CIFS proxy may serve as a pass-through mechanism, and as a cache, to allow the client computer to read from and write to the file server substantially unimpeded. If a file closing request is sent by the client computer, the transparent CIFS proxy intercepts the close request, scans the entire file for any potential problem prior to relaying the close request to the server for closing the file. If a problem is encountered during scanning, the transparent CIFS proxy may issue commands to cause the file server to close a null file, i.e., not saving the file that contains the potential problem discovered during scanning.

In a nonobvious manner, the transparent CIFS proxy acts substantially transparently to both the client computer and the file server. In other words, the transparent CIFS proxy behaves such that the presence of the transparent CIFS proxy is substantially transparent to both the client computer and the file server. In embodiments of the invention, the mechanism of IP redirection is employed. IP redirection is a well-understood and well-documented technique to those skilled in the art. See, for example, (http://www.balabit.com/products/oss/tproxy/) which may be employed in cooperation with netfilter/iptables in Linux (http://www.netfilter.org/).

In an embodiment, the transparent CIFS proxy forges its communication with the client computer so that the transparent CIFS proxy appears to the client computer to be the file server. For example, packets transmitted from the CIFS proxy to the client computer may have the file server's IP address as the source IP address. On the other hand, the transparent CIFS proxy forges its communication with the file server so that the transparent CIFS proxy appears to the file server to be the client computer. For example, packets transmitted from the CIFS proxy to the file server may have the client computer's IP address as the source IP address.

The transparent CIFS proxy not only forges its own identity but also forges, in many cases, the content of the communication on behalf of the sender. For example, during the closing of a file that the transparent CIFS proxy has determined to have a problem, the transparent CIFS proxy may forge commands to cause the file server to save a null file instead of saving the entire file as requested by the client computer.

The features and advantages of the invention may be better understood with reference to the figures and the discussions that follow. FIG. 1 show, in accordance with an embodiment of the invention, a scanning arrangement 100 that includes a client computer 102 and a file server 104. Client computer 102 and server 104 are shown conceptually and are typically connected through some type of network, such as a private and/or public TCP/IP network. As can be seen, client computer 102 has the example IP address 10.10.10.10 while file server 104 has the example IP address 10.10.10.11.

A transparent CIFS proxy 106 is disposed in-line in between the communication path between client computer 102 and file server 104. Transparent CIFS proxy 106 opens a socket connection to communicate with client computer 102 as well as a socket connection to communicate with file server 104. Once the IP addresses of client computer 102 and file server 104 are ascertained, transparent CIFS proxy 106 proceeds to snoop on the communication between client computer 102 and file server 104 to intercept file-related commands.

For example, the packets that are snooped may be parsed (using known parsing techniques, for example) to ascertain whether the packets pertain to CIFS traffic (i.e., to file-related operations). If the communication pertains to a file-related operation, the transparent CIFS proxy may undertake actions to provide scanning protection in a manner that is substantially transparent to both the client computer and the file server. While performing its scanning function, the transparent CIFS proxy may communicate to the client computer and/or the file server using the forged identities to, for example, relay CIFS commands or to prevent time-out.

Figure 2:
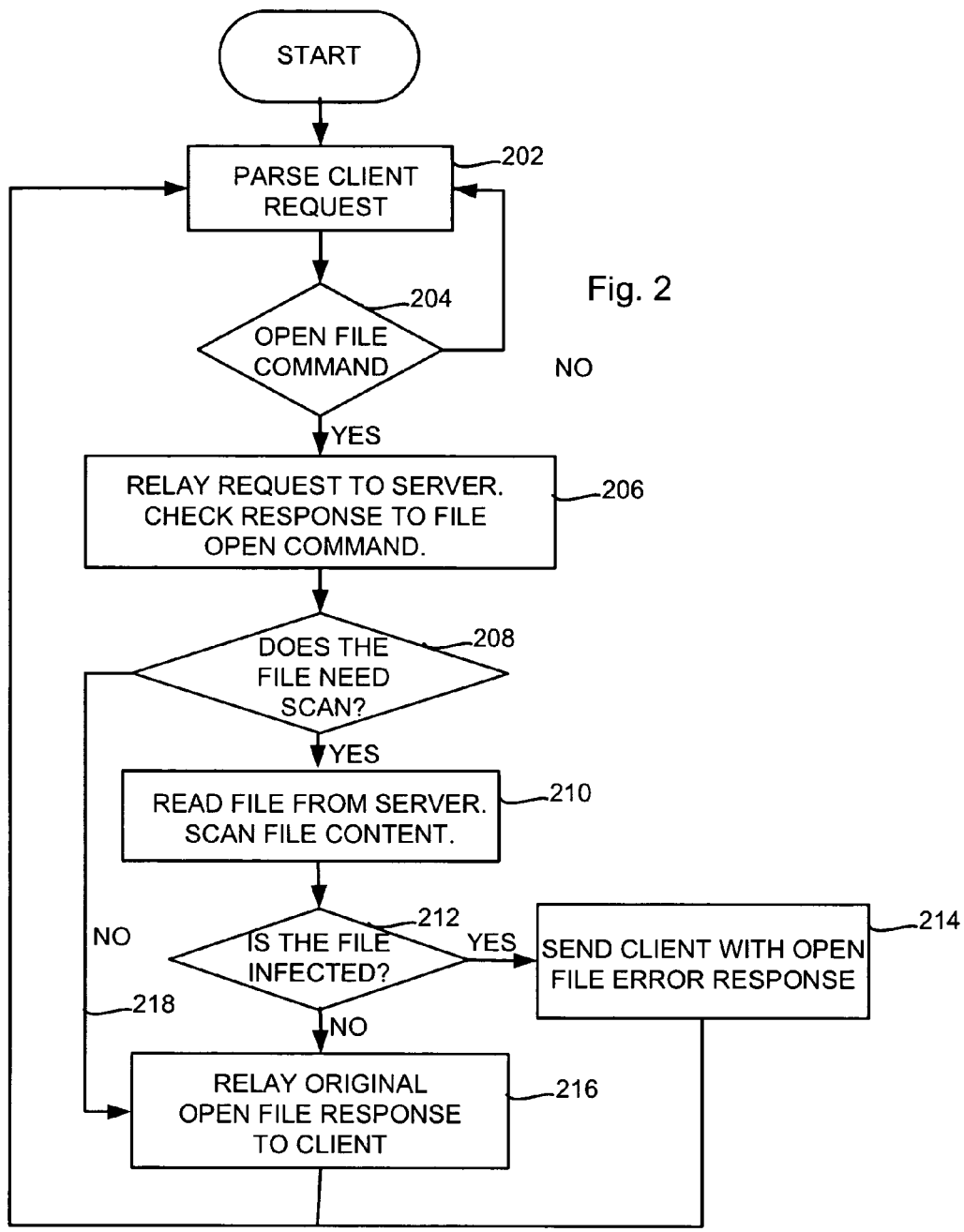
FIG. 2 shows, in accordance with an embodiment, the steps taken when a client computer issues a request to open a file.

FIG. 2 shows, in accordance with an embodiment, the steps taken when a client computer issues a request to open a file. In step 202, the CIFS request from the client computer is intercepted and parsed. If the request pertains to a command to open a file (204), the transparent CIFS proxy relays the request to the file server (204) using the forged identity so that the request appears to the file server as coming from the client computer itself. The file requested and/or furnished is checked to determine whether scanning is needed (208). If scanning is not needed, the transparent CIFS proxy forwards the file to the client computer as a response to the open file request (218 to 216).

If scanning is needed, the transparent CIFS proxy then reads the file from the file server (210) and scans the content. During scanning, the transparent CIFS proxy may send an acknowledgement to the client computer using the forged identity to prevent a request time-out, for example. If the file is determined to be a problem (212), the transparent CIFS proxy sends (214) an error indication to the client computer, essentially indicating to the client computer that the file cannot be opened. In this manner, files that contain malicious code are not spread from the file server to the client computer using the CIFS protocol. On the other hand, if scanning yields a satisfactory result, the transparent CIFS proxy forwards the open file response to the client computer (216).

Figure 3:
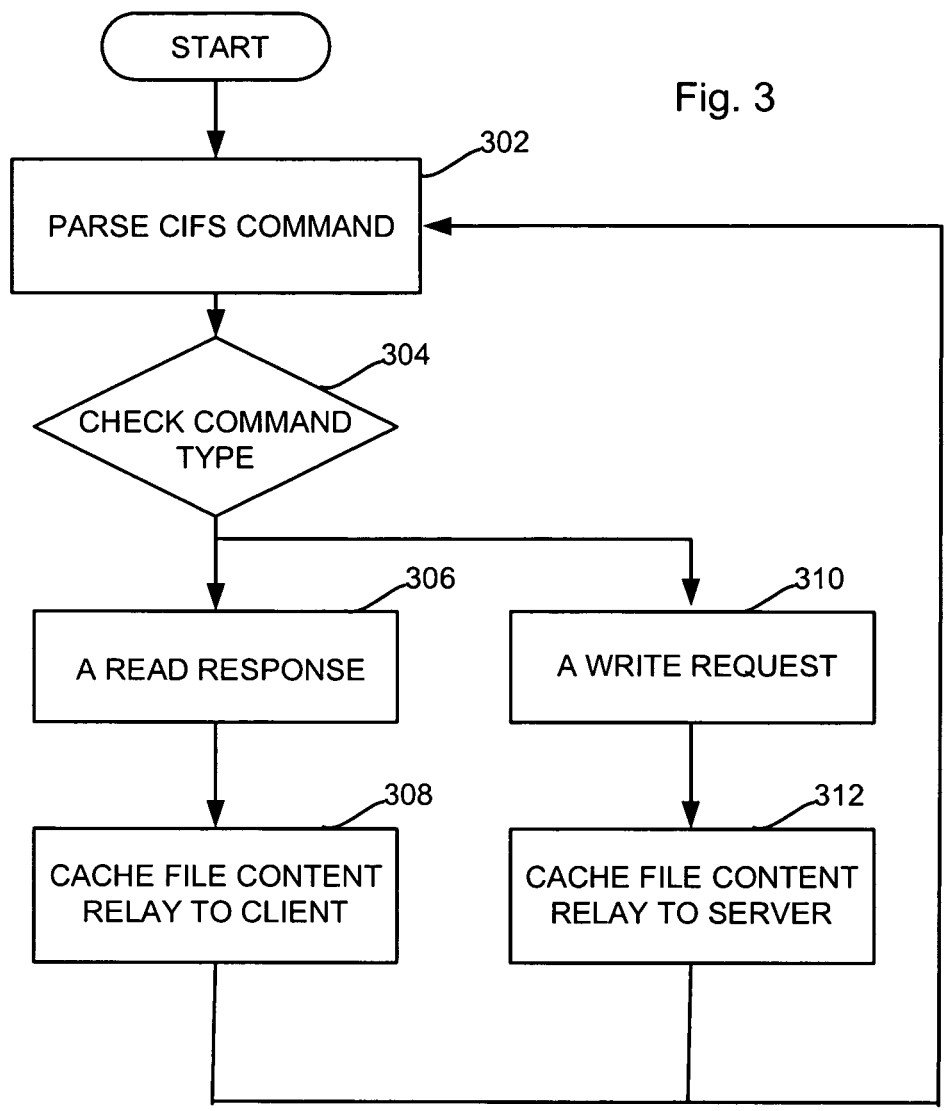
FIG. 3 shows, in accordance with an embodiment of the invention, the steps taken for read responses from the file server and write requests from the client computer.

FIG. 3 shows, in accordance with an embodiment of the invention, the steps taken for read responses from the file server and write requests from the client computer. Generally speaking, if the parsing (302) of the CIFS traffic reveals that the command type (304) is a response by the file server to a read request from the client computer (306), the transparent CIFS proxy may cache the file content provided by the file server and relays the content to the client computer (308). If the parsing (302) of the CIFS traffic reveals that the command type (304) is a write request from the client computer (310), the transparent CIFS proxy may cache the file content provided by the client computer and relays the content to the server computer (312). In this manner, reading and writing may take place rapidly and substantially transparently.

Figure 4:
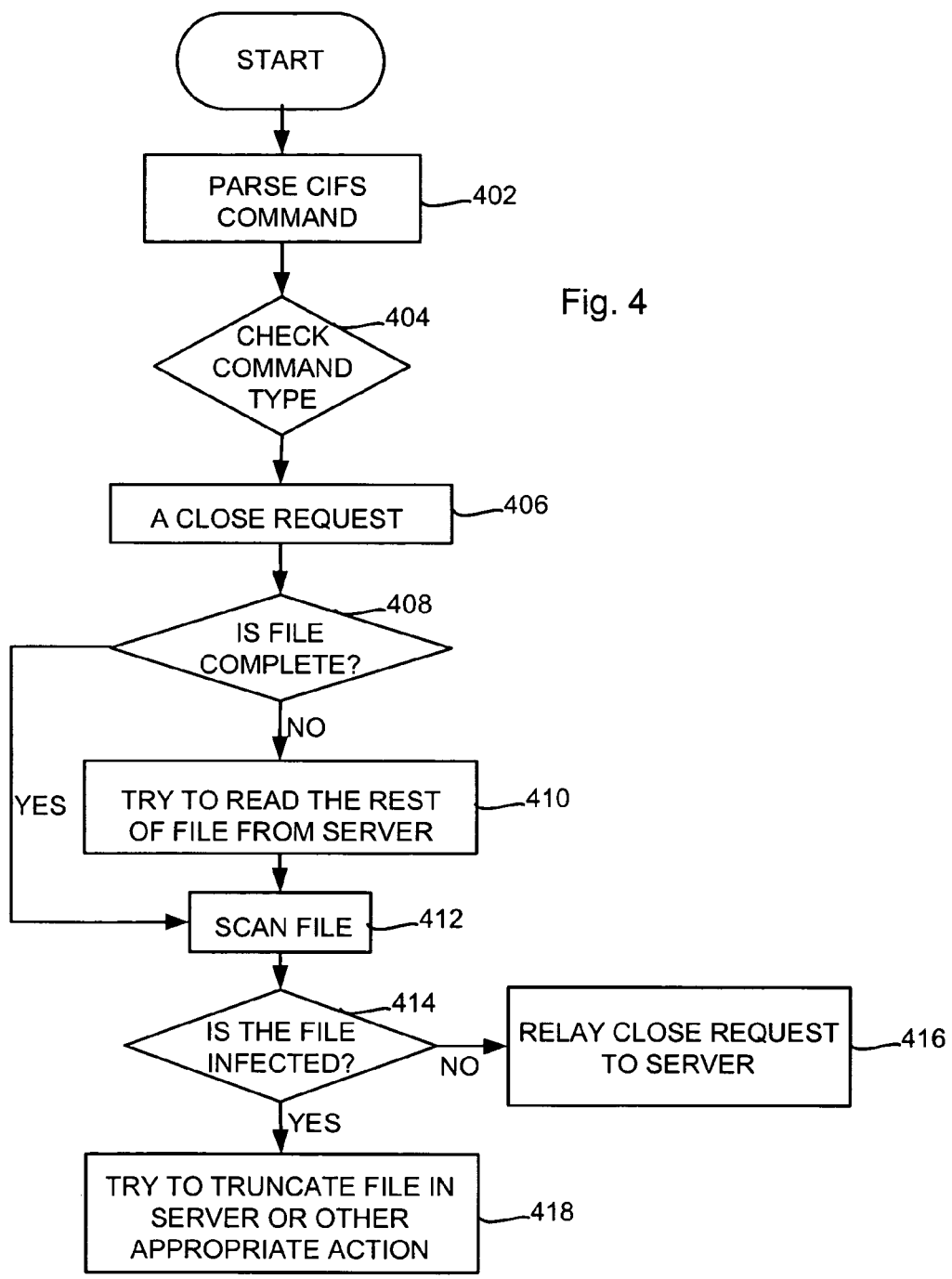
FIG. 4 shows, in accordance with an embodiment of the present invention, the steps taken when a close request is intercepted.

FIG. 4 shows, in accordance with an embodiment of the present invention, the steps taken when a close request is intercepted. A client computer may send a close request to close a file that it has opened for reading and/or writing and/or modifying. If the parsing (402) of the CIFS traffic reveals that the command type (404) is a file close request from the client computer (406), the transparent CIFS proxy may ascertain (408) whether it has the file in its memory for scanning. If the file is not available, the transparent CIFS proxy may obtain the file from the file server (410) and scan the file (412). If the file is in fact already available, the transparent CIFS proxy may simply begin scanning the file (412).

If the scanning reveals (414) that there may be a problem (e.g., the file may contain malware, such as a virus, an adware program that is configured to pop-up advertising or redirect browser traffic or snoops on user's data, or the like, or the closing of this particular file by this particular user may violate some security policy, etc.), the transparent CIFS proxy may take an action that prevents the file from being saved on the server computer. For example, the transparent CIFS proxy may forge the close command by issuing another command (ostensibly from the client computer since the transparent CIFS proxy uses the client computer IP address as the source address) to cause the file server to save only a null file (418) or take other appropriate actions. This prevents a problem file from being saved on the server. Upon detection of a problem, the transparent CIFS proxy may also cause a notification to be sent to a human via a console display and/or may cause the problem to be logged in a log file. On the other hand, if the scanning does not reveal a problem, the file close request is relayed to the file server to allow the file to close normally (416).

The transparent CIFS proxy, with it scanning protection, advantageously prevents malicious code from using the CIFS protocol to spread through the CIFS network. This is accomplished by scanning files provided by the file server upon read requests before the files are furnished to the client computer. Further, infected files are prevented from being saved onto the file server during file closings. In addition to the virus/malware scanning capabilities, any number of business rules may be implemented by the transparent CIFS proxy. For example, the transparent CIFS proxy may limit access to certain files by certain individuals (identified by user ids or client computer IP addresses, for example) based on a set of business rules. As another example, the transparent CIFS proxy may permit file reads but may not permit file writing by certain individuals. These capabilities further enhance the functionalities of the transparent CIFS proxy, and may be efficiently implemented USING techniques discussed herein.

As can be appreciated from the foregoing, embodiments of the invention render it possible to provide scanning capabilities and/or scanning protection for CIFS-enabled network without requiring tedious and time-consuming integration efforts on the part of the system integrator. In various embodiments herein, the transparent CIFS proxy may be implemented in software, hardware, or a combination thereof. If the transparent CIFS proxy is implemented on a network bridge, for example, no software installation on the client computer and/or the file server would be required. With the transparent CIFS proxy of the present invention, neither the client computer nor the file server may be aware of the existence of the transparent CIFS proxy, other than the fact that scanning protection is now provided.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer-implemented method for handling CIFS (Common Internet File System) communication between a client computer and a server computer, the method comprising:

providing a CIFS proxy between said client computer and said server computer;

providing, using said CIFS proxy, to said server computer a client IP address that is associated with said client computer as a proxy-to-server source IP address when communicating from said proxy to said server computer;

providing, using said CIFS proxy, to said client computer a server IP address that is associated with said server computer as a proxy-to-client source IP address when communicating from said proxy to said client computer;

monitoring, using said CIFS proxy, client requests and server responses, said client requests being originated from said client computer and destined for said server computer, said server responses being originated from said server computer and destined for said client computer;

intercepting, using said CIFS proxy, an open-file request provided by said client computer for opening a file stored in said server computer;

performing, using said CIFS proxy, open-file processing on said file or a copy of said file;

determining, using said CIFS proxy, that a first command provided by said client computer is for closing said file;

performing, using said CIFS proxy, close-file processing on said file or a copy of said file after said determining; and issuing, using said CIFS proxy, a second command to said server computer after said performing said close-file processing using said client IP address as said proxy-to-server source IP address, said second command preventing said server computer from saving said file and causing said server computer to save a null file.

2. The method of claim 1 wherein said open-file processing including content scanning.

3. The method of claim 1 wherein said open-file processing includes executing a security policy.

4. The method of claim 1 further comprising:

if a server response of said server responses pertains to a response to provide data from a second file that is already opened, said server response being responsive to a read request from said client computer, relaying said data provided by said server response to said client computer without performing said open-file processing.

5. The method of claim 4 further comprising caching said data provided by said server response at said CIFS proxy prior to said relaying.

6. The method of claim 1 further comprising:

if said request of said client requests pertains to a write request to write data from said client computer to said server computer to write to a file that is already opened, relaying said data associated with said write request to said server computer without performing said processing.

7. The method of claim 6 further comprising caching said data associated with said write request at said CIFS proxy prior to said relaying.

8. The method of claim 1 further comprising:
if a request of said client requests pertains to a close request from said client computer to said server computer to close said file that is already opened, performing steps g) through j)
g) obtaining a copy of said file that is requested to be closed at said CIFS proxy;
h) performing, using said CIFS proxy, close-request processing on said copy of said file that is requested to be closed, said close-request processing determining whether said file that is requested to be closed is to be saved on said server computer,
i) if said close-request processing determines that said file that is requested to be closed is not to be saved on said server computer, performing an action that prevents said file from being saved on said server computer instead of relaying said close request to said server computer,
j) if said close-request processing determines that said file that is requested to be closed is to be saved on said server computer, relaying said close request to said server computer, thereby causing said file that is requested to be closed to be saved on said server computer.

9. The method of claim 8 wherein said action that prevents said file from being saved on said server computer includes sending a CIFS command from said CIFS proxy to said server computer to cause said null file to be saved instead of saving said file that is requested to be saved.

10. A computer-implemented method for handling CIFS (Common Internet File System) communication between a client computer and a server computer, the method comprising:
providing a CIFS proxy between said client computer and said server computer;
providing, using said CIFS proxy, to said server computer a client IP address that is associated with said client computer as a proxy-to-server source IP address when communicating from said proxy to said server computer;
providing, using said CIFS proxy, to said client computer a server IP address that is associated with said server computer as a proxy-to-client source IP address when communicating from said proxy to said client computer;
monitoring, using said CIFS proxy, client requests and server responses, said client requests being originated from said client computer and destined for said server computer, said server responses being originated from said server computer and destined for said client computer;
intercepting, using said CIFS proxy, an open-file request provided by said client computer for opening a file stored in said server computer;
relaying said open-file request to said server computer using said client IP address as said proxy-to-server source IP address;
scanning, using said CIFS proxy, said file or a copy of said file;
sending, using said CIFS proxy, an acknowledgement to said client computer using said server IP address as said proxy-to-client source IP address during said scanning to prevent a request time-out;
determining, using said CIFS proxy, that a first command provided by said client computer is for closing said file;
performing, using said CIFS proxy, close-file processing on said file or a copy of said file after said determining; and
issuing, using said CIFS proxy, a second command to said server computer after said performing said close-file processing using said client IP address as said proxy-to-server source IP address, said second command preventing said server computer from saving said file and causing said server computer to save a null file.

11. The method of claim 10 wherein said scanning detects potential malware presence that includes a computer virus presence.

12. The method of claim 10 wherein said scanning detects potential malware presence that includes an adware program presence.

13. The method of claim 10 further comprising:
if a server response of said server responses pertains to a response to provide data from a second file that is already opened, said server response being responsive to a read request from said client computer, relaying said data provided by said server response to said client computer without performing said scanning.

14. The method of claim 13 further comprising caching said data provided by said server response at said CIFS proxy prior to said relaying.

15. The method of claim 10 further comprising:
if said request of said client requests pertains to a write request to write data from said client computer to said server computer to write to a file that is already opened, relaying said data associated with said write request to said server computer without performing said scanning.

16. The method of claim 15 further comprising caching said data associated with said write request at said CIFS proxy prior to said relaying.

17. The method of claim 10 further comprising:
if a request of said client requests pertains to a close request from said client computer to said server computer to close said file that is already opened, performing steps f) through i)
f) obtaining a copy of said file that is requested to be closed at said CIFS proxy,
g) performing, using said CIFS proxy, said scanning on said copy of said file that is requested to be closed on said server computer,
h) if said scanning detects said potential malware presence, performing an action that prevents said file from being saved on said server computer instead of relaying said close request to said server computer, and
i) if said scanning does not detect said potential malware presence, relaying said close request to said server computer, thereby causing said file that is requested to be closed to be saved on said server computer.

18. The method of claim 17 wherein said action that prevents said file from being saved on said server computer includes sending a CIFS command from said CIFS proxy to said server computer to cause said null file to be saved instead of saving said file that is requested to be saved.

19. The method of claim 17 wherein said action that prevents said file from being saved on said server computer includes notifying a human via a console display that an attempt to save an infected file has been attempted.

20. The method of claim 17 wherein said action that prevents said file from being saved on said server computer includes logging an entry that reflects that an attempt to save an infected file has been attempted.

21. A computer-implemented method for handling CIFS (Common Internet File System) communication between a client computer and a server computer, the method comprising:

providing a CIFS proxy between said client computer and said server computer; providing, using said CIFS proxy, to said server computer a client IP address that is associated with said client computer as a proxy-to-server source IP address when communicating from said proxy to said server computer;

providing, using said CIFS proxy, to said client computer a server IP address that is associated with said server computer as a proxy-to-client source IP address when communicating from said proxy to said client computer;

monitoring, using said CIFS proxy, client requests and server responses, said client requests being originated from said client computer and destined for said server computer, said server responses being originated from said server computer and destined for said client computer;

determining, using said CIFS proxy, that a first command provided by said client computer is for closing a file;

performing, using said CIFS proxy, close-file processing on said file or a copy of said file after said determining; and issuing, using said CIFS proxy, a second command to said server computer after said performing said close-file processing using said client IP address as said proxy-to-server source IP address, said second command preventing said server computer from saving said file and causing said server computer to save a null file.

22. The method of claim 21 wherein said close-request processing including content scanning.

23. The method of claim 21 wherein said close-request processing includes executing a security policy.

24. The method of claim 21 further comprising logging, using said CIFS proxy, a problem in a log file, said problem being detected during said performing said close-file processing.

\* \* \* \* \*